United States Patent
Argade et al.

(10) Patent No.: US 12,197,533 B2
(45) Date of Patent: Jan. 14, 2025

(54) APPROXIMATION OF MATRICES FOR MATRIX MULTIPLY OPERATIONS

(71) Applicant: Advanced Micro Devices, Inc., Santa Clara, CA (US)

(72) Inventors: Pramod Vasant Argade, San Diego, CA (US); Swapnil P. Sakharshete, San Diego, CA (US); Maxim V. Kazakov, San Diego, CA (US); Alexander M. Potapov, San Diego, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 197 days.

(21) Appl. No.: 17/214,784

(22) Filed: Mar. 26, 2021

(65) Prior Publication Data
US 2022/0309126 A1    Sep. 29, 2022

(51) Int. Cl.
G06F 17/16    (2006.01)
G06F 7/523    (2006.01)
G06F 7/544    (2006.01)
G06F 7/556    (2006.01)

(52) U.S. Cl.
CPC .............. G06F 17/16 (2013.01); G06F 7/523 (2013.01); G06F 7/5443 (2013.01); G06F 7/556 (2013.01)

(58) Field of Classification Search
CPC ............. G06F 17/16; G06F 17/17–175; G06F 7/5443; G06F 7/523; G06F 7/556; G06N 3/063
USPC ....................................................... 708/520
See application file for complete search history.

(56) References Cited

U.S. PATENT DOCUMENTS

| | | | |
|---|---|---|---|
| 8,620,984 | B2 | 12/2013 | Mazahreh |
| 9,600,194 | B1 | 3/2017 | Gschwind |
| 10,747,501 | B2 | 8/2020 | Heddes et al. |
| 11,150,298 | B1 | 10/2021 | Bingham et al. |
| 11,500,962 | B1 * | 11/2022 | Meyer ............... G06N 3/063 |
| 2009/0024685 | A1 | 1/2009 | Salama et al. |
| 2012/0198212 | A1 | 8/2012 | Raubuch |
| 2013/0007075 | A1 | 1/2013 | Oliver et al. |
| 2014/0331014 | A1 | 11/2014 | Liao |

(Continued)

FOREIGN PATENT DOCUMENTS

DE    102013018915 A1 *  5/2014    ........... G06F 1/3234
KR    1020200050895 A    5/2020

OTHER PUBLICATIONS

Michael L. Scott, Programming Language Pragmatics (3rd Edition), 2009, Elsevier, p. 303-316. Retrieved from Knovel. (Year: 2009).*

(Continued)

*Primary Examiner* — Tan V Mai
(74) *Attorney, Agent, or Firm* — Volpe Koenig

(57) ABSTRACT

A processing device is provided which comprises memory configured to store data and a processor configured to receive a portion of data of a first matrix comprising a first plurality of elements and receive a portion of data of a second matrix comprising a second plurality of elements. The processor is also configured to determine values for a third matrix by dropping a number of products from products of pairs of elements of the first and second matrices based on approximating the products of the pairs of elements as a sum of the exponents of the pairs of elements and performing matrix multiplication on remaining products of the pairs of elements of the first and second matrices.

21 Claims, 5 Drawing Sheets

(56) References Cited

U.S. PATENT DOCUMENTS

| | | |
|---|---|---|
| 2014/0351564 A1 | 11/2014 | Bekas et al. |
| 2014/0365548 A1* | 12/2014 | Mortensen ............ G06F 9/3001 |
| | | 708/523 |
| 2016/0140084 A1* | 5/2016 | Daga ....................... G06F 17/16 |
| | | 708/207 |
| 2017/0147531 A1 | 5/2017 | Costas et al. |
| 2019/0042250 A1 | 2/2019 | Anders et al. |
| 2019/0065146 A1 | 2/2019 | Heddes et al. |
| 2019/0212980 A1 | 7/2019 | Malladi |
| 2019/0272308 A1 | 9/2019 | Doi |
| 2019/0340492 A1 | 11/2019 | Burger |
| 2020/0364558 A1 | 11/2020 | Kwon et al. |
| 2022/0075598 A1 | 3/2022 | Werner et al. |
| 2022/0108157 A1* | 4/2022 | Hunter ....................... G06F 7/08 |
| 2022/0291901 A1* | 9/2022 | Zhang .................. G06F 7/5443 |

OTHER PUBLICATIONS

Joe Z., Answer on "Converting Int to Float or Float to Int using Bitwise operations (software floating point)", Dec. 2013, Stack Overflow, p. 2. Snapshot from Wayback Machine captured on Oct. 6, 2019. (Year: 2019).*

T. H. Myer and I. E. Sutherland, 'On the Design of Display Processors', Commun. ACM, vol. 11, No. 6, pp. 410-414, Jun. 1968. (Year: 1968).*

Tannenbaum, Machine Translation of DE-102013018915-A1, 2014. (Year: 2014).*

Artemov, Anton V., "Approximate Multiplication of Nearly Sparse Matrices with Decay in a Fully Recursive Distributed Task-Based Parallel Framework", arXiv:1906.08148v7, Feb. 20, 2021, 27 pgs.

* cited by examiner

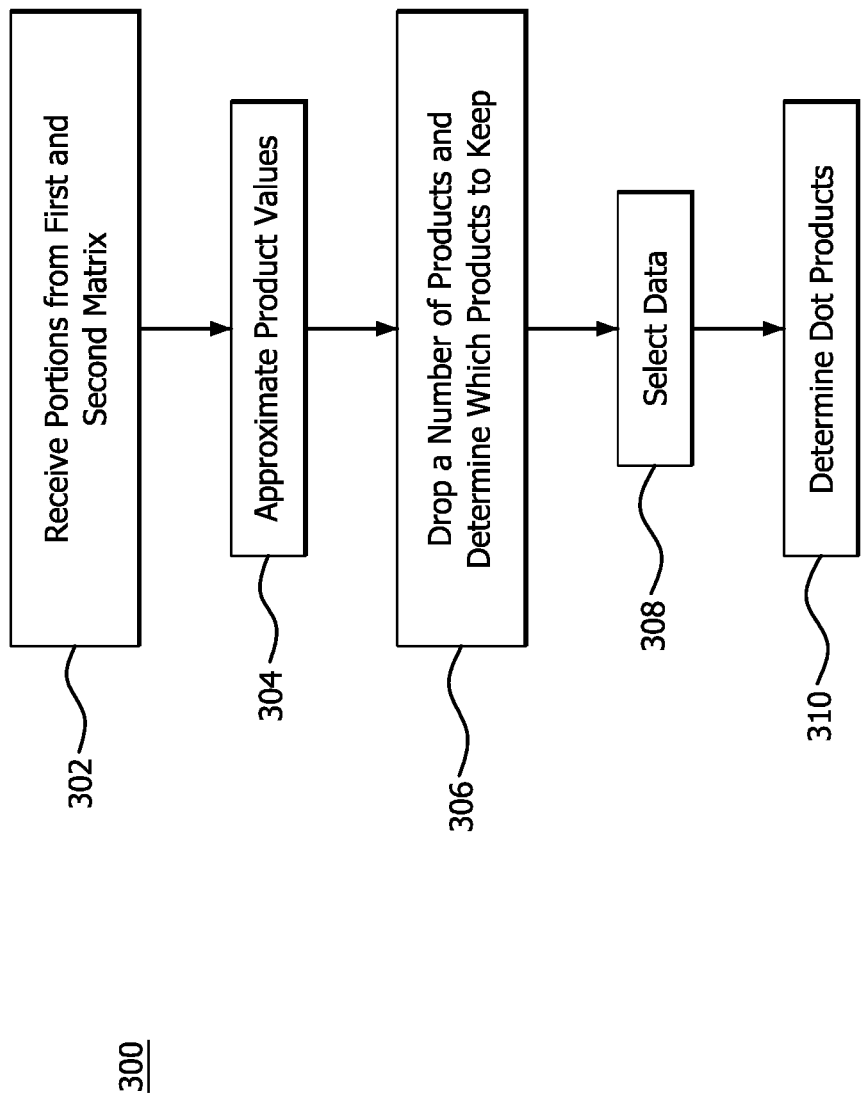

APPROXIMATION OF MATRICES FOR MATRIX MULTIPLY OPERATIONS

CROSS REFERENCE TO RELATED APPLICATION(S)

This application is being filed concurrently with U.S. Non-Provisional patent application Ser. No. 17/21,779 entitled DATA COMPRESSOR FOR APPROXIMATION OF MATRICES FOR MATRIX MULTIPLY OPERATIONS, which is incorporated herein by reference as if fully set forth.

BACKGROUND

Matrix multiplication is a key building block across a number of application domains, including use in high performance computing (HPC) and machine learning. Matrix multiplication is also used in convolutional neural networks, recurrent neural networks and other forms of artificial neural networks.

Matrix multiplication techniques employ parallelization to increase the efficiency of matrix multiplication. For example, two matrices are typically divided into smaller portions (e.g., columns, rows, and portions of columns and rows) and a matrix multiplication operation of the two matrices is performed by executing a plurality of matrix multiplication computations each including the multiplication of a portion of one matrix with a portion of another matrix. The matrix multiplication computations are mapped to and executed by different processor cores of a processor network to perform the matrix multiplication operation.

BRIEF DESCRIPTION OF THE DRAWINGS

A more detailed understanding can be had from the following description, given by way of example in conjunction with the accompanying drawings wherein:

FIG. 3 is a flow diagram illustrating an example method of selecting data for matrix multiplication according to features of the disclosure;

FIG. 4A shows a first example of an array of approximated product exponent values according to features of the disclosure;

FIG. 4B shows a second example of an array of approximated product exponent values according to features of the disclosure;

FIG. 4C shows a third example of an array of approximated product exponent values according to features of the disclosure;

FIG. 4D shows a fourth example of an array of approximated product exponent values according to features of the disclosure.

DETAILED DESCRIPTION

Figure 1:
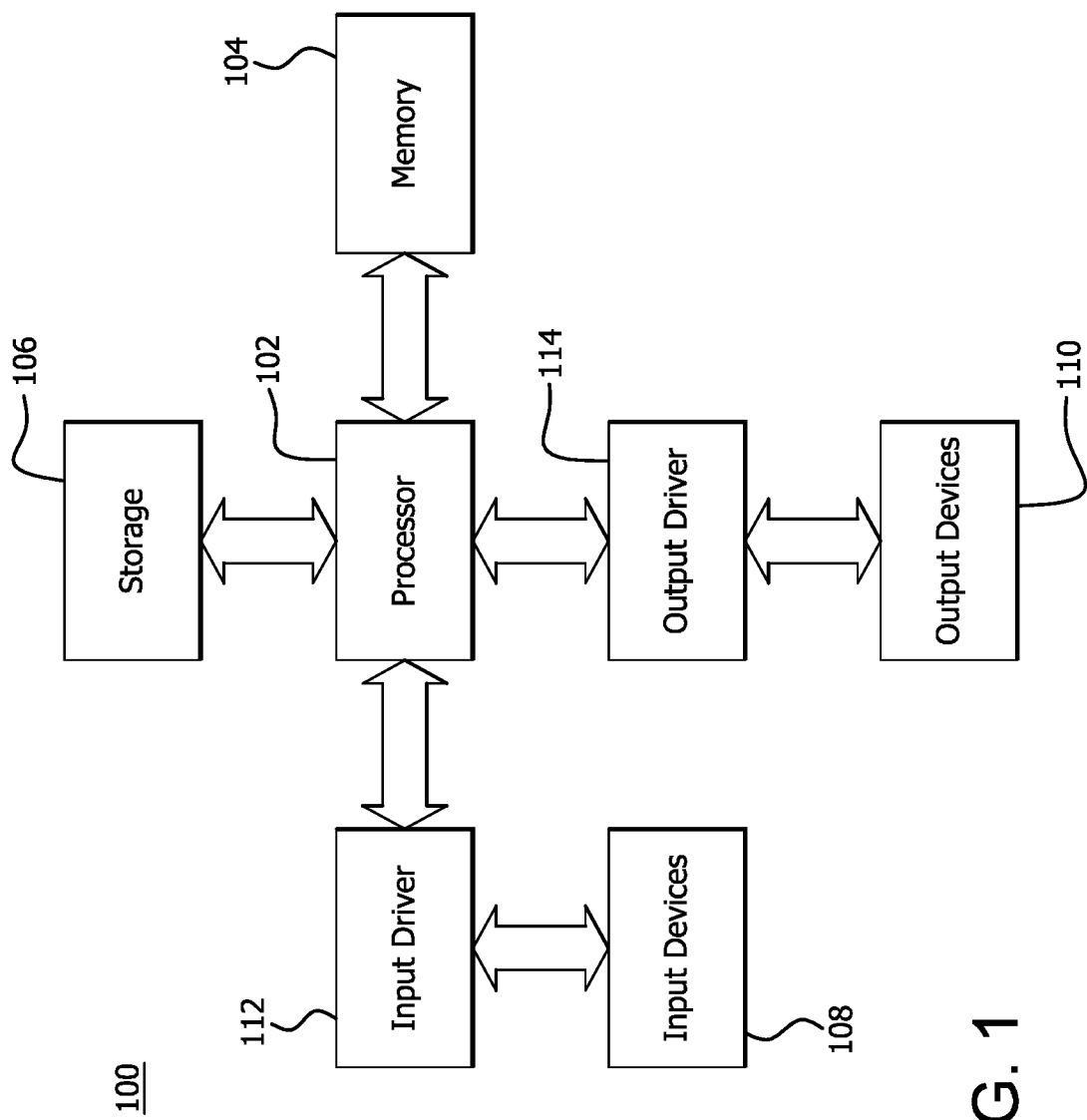
FIG. 1 is a block diagram of an example device in which one or more features of the disclosure can be implemented.

As used herein, programs include sequences of instructions to be executed using one or more processors to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems. Processors include, for example, multiple processing cores (e.g., compute units (CUs)) each of which are configured to read and execute program instructions, such as instructions to perform matrix multiplications.

Matrix multiplication includes calculating dot products of sub-portions of data of a first matrix and a second matrix. A matrix multiplication operation includes the calculation $C=A \times B$, where A, B, C are matrices of sizes $M \times K$, $K \times N$, and $M \times N$, respectively. Each element in matrix C is a dot product of a row of matrix A and a column of matrix B. For example, a multiply accumulate operation calculates the product of a pair of values, each value corresponding to an element of a portion (e.g., row, column, part of a row or column, or multiple rows or columns) of a matrix, and adds the product to an accumulator using hardware components known as a multiplier accumulator (MAC). For example, a $64 \times 64$ product can be implemented as four $16 \times 16$ MACs or eight $8 \times 8$ MACs. Matrix multiplication typically involves many calculations, which is time consuming and expensive.

The present application provides devices and methods for efficiently performing an approximation of matrix multiplication. Features of the present disclosure include devices and methods of dynamically determining an output matrix by dropping a number of products (i.e., products of pairs of elements of two input matrices), along the common dimension K of the two matrices, from the products to be used for the dot product calculations of the matrix multiplication of input matrices. The dropped products are the products approximated as having the smallest exponent sums among the products to be used for the dot product calculations. As described in more detail below, a target number of elements, to be kept (i.e., not dropped) and provided to the MACs, is determined based on sums of bit values of the approximated product values (referred to herein as product exponent values, starting with a sum of the most significant bits (MSBs) of the product exponent values and continuing through sets of each set of corresponding next significant bits, until the target number of product exponent values is determined to be kept and, in turn, indicating which corresponding elements of matrices A and B are provided to MACs for matrix multiplication.

Features of the present disclosure reduce the number of products without first sorting the elements of the input arrays according to their values, which would otherwise be expensive to implement in hardware.

For example, a $64 \times 64$ product is reduced to a $48 \times 48$ product by keeping the largest approximated 48 product values (i.e., dropping the lowest 16 approximated values) among the $64 \times 64$ product values. By way of example, if a $64 \times 64$ product is implemented as a $16 \times 16$ MAC, four $16 \times 16$ MACs are reduced to three $16 \times 16$ MACs, resulting in a 25% reduction time to execute the task and a reduction in energy cost to execute the task. Likewise, if the $64 \times 64$ product is implemented as an $8 \times 8$ MAC, eight $8 \times 8$ MACs are reduced to 6 $8 \times 8$ MACs, also resulting in a 25% reduction time. A target number of product values to be kept and provided to the MACs to execute the matrix multiplication, or a target number of product values to be dropped (i.e., dropped product values) from the product values to be provided to the MACs, can be any number and is determined based on various factors during runtime, such as an amount of result error that can be tolerated by the approximations for a particular task or application. For example, when used for machine learning training, a target number of products determined to be dropped is based on the effect the approximations will have on the accuracy of a resulting network. The target number of products values to be dropped can also be determined based the size of the common dimension K. For example, based on heuristics, additional product values can be dropped for larger values of K and additional product values can kept and provided to the MACs for lower values of K.

Features of the present disclosure include performing matrix multiplication for a variety of different data types, such as float data types (e.g., FP32, FP16 and BF16 formats) and integer data types (e.g., int8 format).

A processing device is provided which comprises memory configured to store data and a processor configured to receive a portion of data of a first matrix comprising a first plurality of elements and receive a portion of data of a second matrix comprising a second plurality of elements. The processor is also configured to determine values for a third matrix by dropping a number of products from products of pairs of elements of the first and second matrices based on approximating the products of the pairs of elements as a sum of exponents of the pairs of elements and performing matrix multiplication on remaining products of the pairs of elements of the first and second matrices.

A matrix multiplication data selection method is provided which comprises receiving a portion of data of a first matrix comprising a first plurality of elements and receiving a portion of data of a second matrix comprising a second plurality of elements. The method also comprises determining values for a third matrix by dropping a number of products from products of pairs of elements of the first and second matrices based on approximating the products of the pairs of elements as a sum of exponents of the pairs of elements and performing matrix multiplication on remaining products of the pairs of elements of the first and second matrices.

A non-transitory computer readable medium is provided which comprises instructions for causing a computer to execute a matrix multiplication data selection method, comprising receiving a portion of data of a first matrix comprising a first plurality of elements, receiving a portion of data of a second matrix comprising a second plurality of elements, and determining values for a third matrix by dropping a number of products from products of pairs of elements of the first and second matrices based on approximating the products of the pairs of elements as a sum of exponents of the pairs of elements and performing matrix multiplication on remaining products of the pairs of elements of the first and second matrices.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), including dynamic RAM (DRAM) and static RAM (SRAM). The RAM includes for example, cache memory, scratchpad memory and registers.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Features of the present disclosure are described herein using CUs as an example of processor cores. CUs include one or more single instruction, multiple data (SIMD) units that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit includes sixteen lanes, where each lane executes the same instruction at the same time as the other lanes in a SIMD unit but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. The parallelism afforded by CUs is suitable for matrix multiplication, such as for example, matrix multiplication used in graphics related operations such as pixel value calculations, vertex transformations, and other graphics operations.

Figure 2:
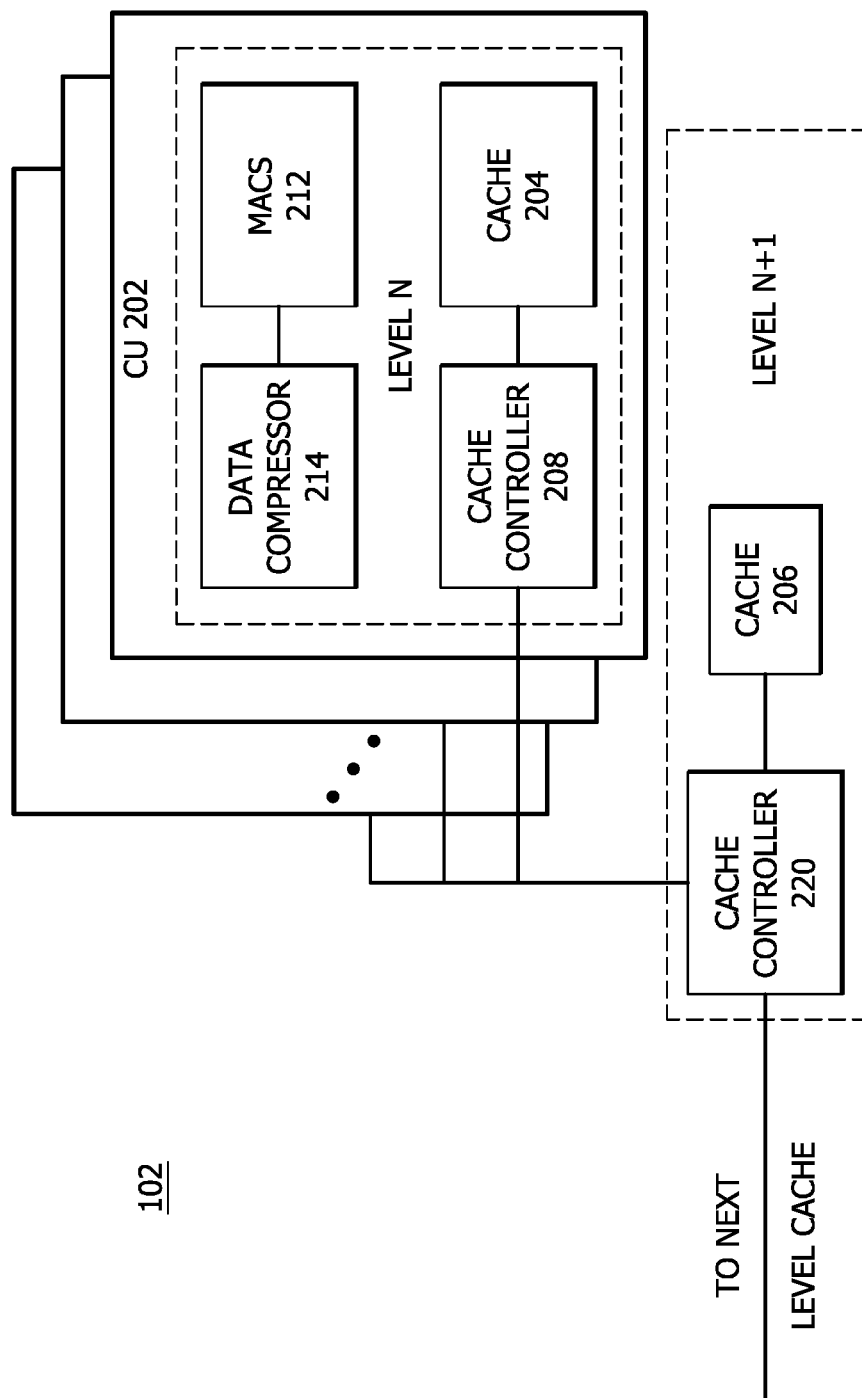
FIG. 2 is a block diagram illustrating exemplary components of a processor in which one or more features of the disclosure can be implemented.

FIG. 2 is a block diagram illustrating an example of processor 102 shown in FIG. 1 in which one or more features of the disclosure can be implemented. As shown in FIG. 2, processor 102 includes a plurality of CUs 202. Each CU 202 includes a level N (e.g., level 1) cache controller 208 in communication with a corresponding level N cache 204 and is configured to process data using the corresponding level N cache 204. Alternatively, a plurality of level N cache controllers 208 (e.g., a cache controller 208 for each CU 202 or a plurality of cache controllers 208 each in communication with a group of CUs 202) is used to process data.

As shown in FIG. 2, processor 102 also includes a level N+1 (e.g., level 2) cache controller 210 in communication with level N+1 cache 206 and is configured to process data using a level N+1 cache 206. Alternatively, a plurality of level N+1 cache controllers, in communication with one or more corresponding level N+1 caches, is used to process data. As shown in FIG. 2, cache controller 210 is also in communication with a next cache level (e.g., level 3) and each level N cache controller 208. Additionally, or alternatively, each CU 202 is in communication with different types of memory 104, such as registers and scratchpad memory.

As shown in FIG. 2, each CU 202 also includes MACs 212 and data compressor 214 in communication with the MACs 212. The MACs 212 are configured to calculate products of element pairs of portions of matrices (e.g., approximated products exponent values) and accumulate (e.g., store) the products to execute matrix multiplication operations. A target number of products, which are approximated as the products having the smallest exponent sums, are dropped from the products to be used by the MACs 212 to execute the dot product calculations of the matrix multiplication.

Data compressor 214 includes hardware circuitry configured to determine, from the exponent values (i.e., exponent sums), which of the exponent values are to be kept (i.e., not dropped) and provided to the MACs 212 based on their bit values, starting from their most significant bits and continuing through sets of corresponding next significant bits, until the target number of exponent values is determined. Data compressor 214 is also configured to provide the kept exponent values to the MACs 212 to execute the matrix multiplication.

FIG. 3 is a flow diagram illustrating an example method 300 of selecting data for matrix multiplication according to features of the disclosure.

Figure 5:
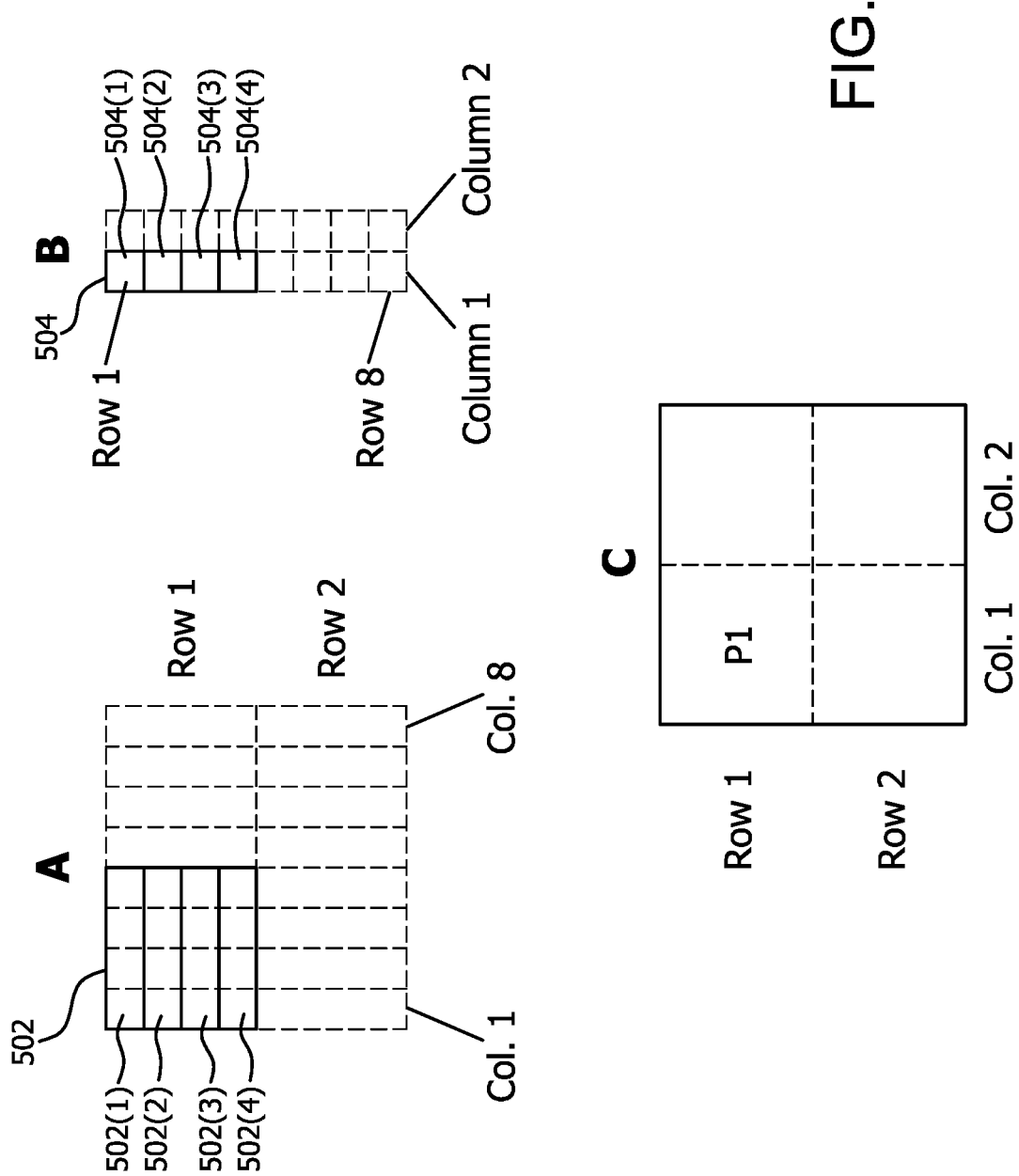
FIG. 5 is a diagram illustrating an example of partial matrix multiplication of two matrices, A and B, and an output matrix C according to features of the disclosure.

As shown at block 302, the method 300 includes receiving a portion of data of a first matrix A and a portion of data of a second matrix B. FIG. 5 is a diagram illustrating an example of partial matrix multiplication of two matrices, A and B, and an output matrix C according to features of the disclosure. As described above, a matrix multiplication operation includes the calculation C=A×B, where A, B, C are matrices of sizes M×K, K×N, and M×N, respectively. Each element in matrix C is a dot product of a row of matrix A and a column of matrix B. For example, a part of the matrix multiplication of matrices A and B is performed, according to features of the present disclosure, by approximating product values of the 4 elements 502(1)-502(4) of element array 502 of matrix B and 4 corresponding elements 504(1)-504(4) of array 504 of matrix B to produce the result in portion 1 (P1) of matrix C.

Although the sizes of matrix A and matrix B in FIG. 5 are different from each other, matrix multiplication operation can be performed for matrices if the number of columns in one matrix is equal to the number of rows in the other matrix. In the example shown in FIG. 5, matrix A includes eight columns and matrix B includes 8 rows. The number of columns and rows in matrices A and B are merely an example. Matrix multiplication is performed, according to features of the present disclosure, for matrices of any size meeting the general rules for matrix multiplication (e.g., number of columns in matrix A is equal to the number of rows in matrix B.

The portions of data of the first matrix and the second matrix can include any number of elements of different data types, such as for example, integer data types (e.g., int8 format) and float data types (e.g., BF16 format). The number of bits representing each element depends on the float format (e.g., FP32, FP16, BF16) and integer format being used (e.g., int8, int16, int32). For example, for float format BF16, each element is represented 16 bits while each exponent is represented by 8 bits.

As shown at block 304, the method 300 includes approximating the values of products of element pairs of the portions of the first and second matrices as a sum of the exponents of the element pairs.

If the elements of the portions of data of the first and second matrices are float data types, then the exponent values can be just extracted from the exponent bits of each element. For example, if the element is in BF16 format, the first bit is a sign bit, bits 2 to 9 are the exponent bits and bits 10-16 are the mantissa bits. Accordingly, the exponent values can be extracted from the values of bits 2 to 9.

If the sub-portions of data of the first matrix A and the second matrix B include 8 elements of int data type format (int8), the exponents are extracted by determining the absolute values for the elements of each sub-portion of data $(A_a[8], B_a[8])$, determining the number of leading zeros to be dropped for each element, representing each element as $1.M*2^e$ (where M is the mantissa of the element value and e is the exponent of the element value) and approximating the exponent value for each element as [the number of bits−1]−$L_A$ (where $L_A$ is the number of leading zeros of the element).

By way of example, if the absolute value of the first element of the first matrix ($A_a[1]$) is 00001011, four leading zeroes are determined to be dropped. The element is represented as $1.011*2^e$ and the exponent value (e) for A[1] is calculated as [the number of bits−1]-$L_A$=7−4=3. If the absolute value of the first element of the second matrix ($B_a[1]$) is 00101111, two leading zeroes are determined to be dropped. The element is represented as $1.01111*2^e$ and the exponent value (e) for A[1] is calculated as [the number of bits−1]−$L_B$=7−2=5. Accordingly, the approximate product (P) of A[1] and B[1] is determined to be 14−($L_A$+$L_B$)=14−8=6.

The same process is performed to determine the approximate product of the remaining 7 elements (A[2-8]) of the sub-portion of the first matrix A and the corresponding remaining 7 elements (B[2-8]) of the sub-portion of the second matrix B. That is, the products of corresponding pairs of elements of the first matrix A and the second matrix B are approximated based on 2, raised to the sum of exponents of the elements of the first matrix A and the second matrix B.

As shown at block 306, the method 300 includes dropping a number of products and determining which products to keep for the matrix multiplication of the first and second portions of matrices A and B. That is, the products are essentially dropped (i.e., not kept for the matrix multiplication) by dropping pairs of elements from the first and second matrices whose corresponding products are approximated, based on a sum of their exponents, as resulting in the smallest products among the products of the element pairs. The remaining products, which are not dropped, are kept for performing matrix multiplication.

FIGS. 4A through 4D show examples of different arrays of approximated product values (referred to herein as product exponent values), which are approximated based on a sum of the exponents of corresponding element pairs, as described above at block 304. A process of determining which product exponent values to be kept and, in turn, indicating which corresponding elements of matrices A and B are provided to MACs 212 in FIG. 2, is now described for each of the arrays of product exponent values shown in FIGS. 4A through 4D. For simplification purposes, the arrays of product exponent values illustrated in FIGS. 4A through 4D are 4 bit values. Features of the present disclosure can be implemented, however, for any number of bits used to show the product values. In addition, for simplification purposes, arrays of 8 product exponent values (corresponding to 8 element pairs) are used and a target number of 6, out of each of the 8 elements, is used as the number of product exponent values to be kept for the arrays of product exponent values shown in FIGS. 4A through 4D. Features of the present disclosure can be implemented, however, for any target number of product exponent values.

For each of the arrays shown in FIGS. 4A through 4D, the determination of which product exponent values to be kept includes summing the values of the bits of corresponding significance of the product exponent values, starting with the most significant bits for the product exponent values, and comparing each of the sums to the target number (e.g., 6) of product exponent values until the target number of product exponent values is determined. For example, for the array of 8 product exponent values shown in FIG. 4A, the MSBs of the 8 product exponent values are summed. In this case, the sum of MSBs of the 8 product exponent values is 6, which is equal to the target number of 6 product exponent values to be kept. Accordingly, the 6 product exponent values, in which the MSB is 1, are determined as the product exponent values to be kept (i.e., indicating which corresponding elements of matrices A and B are to be kept and provided to MACs 212) and the 2 product exponent values, in which the MSB is 0, are determined as the product exponent values to be dropped (i.e., indicating which corresponding elements of matrices A and B are to be dropped and not provided to MACs 212).

For the array of 8 product exponent values shown in FIG. 4B, the sum of MSBs of the 8 product exponent values is 8, which is greater than the target number of 6 product exponent values to be kept. When the sum of the MSBs is greater than 6, the bits of the next lower significance of the 8 product exponent values are summed. In this case, the sum of the bits of the next lower significance (i.e., the 2nd bits) of the 8 product exponent values is equal to 4. Accordingly, the product exponent values, starting with "11" are identified as the 4 largest product exponent values and are kept (i.e., indicating 4 corresponding elements of matrix A and 4 corresponding elements of matrix B which are to be kept and provided to MACs 212). Because the 4 largest product exponent values are 2 less than the target number of 6, however, the product exponent values starting with "10" are identified and the next least significant bits (i.e., $3^{rd}$ bits) of the product exponent values starting with "10" are summed and the result is added to the previous sum. In this case, the sum of the 3rd bits of the product exponent values starting with "10" is equal to 2, which when added to the previous sum of 4, is equal to the target number of 6. Accordingly, the 2 product exponent values, starting with "101" are also identified as product exponent values to be kept (i.e., indicating 2 corresponding elements of matrix A and 2 corresponding elements of matrix B which are to be kept and provided to MACs 212).

For the array of 8 product exponent values shown in FIG. 4C, the sum of the MSBs of the 8 product exponent values is 8, which is greater than the target number of 6 product exponent values to be kept. As described above, when the sum of the MSBs is greater than 6, the bits of the next lower significance of the 8 product exponent values are summed.

In this case (which is the same as the case described above for product exponent values shown in FIG. 4B), the sum of the bits of the next lower significance (i.e., the $2^{nd}$ bits) of the 8 product exponent values is equal to 4. Accordingly, the product exponent values starting with "11" are identified as the 4 largest product exponent values and are kept, but because the 4 largest product exponent values are 2 less than the target number of 6, the product exponent values starting with "10" are identified and the next least significant bits (i.e., $3^{rd}$ bits) of the product exponent values starting with "10" are summed and added to the previous sum of 4. In this case, the sum of the 3rd bits of the product exponent values starting with "10" is equal to 3, which when added to the previous sum of 4 is equal to 7, which is greater than the target number of 6. Therefore, the least significant bits (i.e. the 4th bits) of the 8 product exponent values starting with "10" are summed, which is again equal to 3, and when added to the previous sum of 4, is again greater than the target number of 6. When there are no more bits to be summed and the total of the previous sums is greater than the target number, the first 2 product exponent values in the array starting with "10" are also kept.

For the array of 8 product exponent values shown in FIG. 4D, the sum of the MSBs of the 8 product exponent values is 8, which is greater than the target number of 6 product exponent values to be kept (which is the same as the cases described above for the product exponent values shown in FIGS. 4B and 4C). In this case, however, each of the remaining bits are zero. In this case, the first 6 product exponent values in the array are kept.

The process described above with regard to FIGS. 4A through 4D does not include any sorting (i.e., ordering) of the product values, which would otherwise be expensive to implement in hardware.

As shown at blocks 308, the method 300 includes selecting the data (i.e., the products) which are not determined to be dropped, and instead determined to be kept, as described above at block 306. As shown at block 310, the method 300 includes determining the dot products from the products determined to be kept.

In addition, the information generated by the matrix multiplication operations can be displayed, on a display device (e.g., output device 110 in FIG. 1).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device that improves computational efficiency of a computing system, the processing device comprising:
    memory configured to store data; and
    a processor that is communicatively coupled to the memory, wherein the processor is configured to:
    receive a portion of data of a first matrix and a portion of data of a second matrix, wherein the first matrix comprises a first plurality of elements and the second matrix comprises a second plurality of elements;
    calculate values for a third matrix, wherein the values of the third matrix are determined by:
        dropping a target number of products, determined at run time, from products of pairs of unsorted elements of the first matrix and unsorted elements of the second matrix based on approximating the products of the pairs of elements as a sum of values of bits of corresponding significance of exponents of the pairs of elements; and
        performing matrix multiplication on remaining products of the pairs of elements of the first matrix and the second matrix.

2. The processing device according to claim 1, wherein the products having the smallest sum of the exponents are dropped.

3. The processing device according to claim 2, further comprising a plurality of multiplier accumulators (MACs), and
    wherein the target number reduces a number of MACs used to perform the matrix multiplication.

4. The processing device according to claim 1, wherein the processor is configured to determine which products are to be used to perform the matrix multiplication by:
    summing values of bits of corresponding significance of the exponents of the product, starting with the most significant bits for the exponents of the product, and
    comparing each result of the summing to the target number until the target number of product exponent values is determined.

5. The processing device according to claim 1, wherein the first plurality of elements and the second plurality of elements are in an integer data type format.

6. The processing device according to claim 1, wherein the processor is configured to extract the exponents of the product by:
    determining absolute values of the first plurality of elements and the second plurality of elements;
    determining, for each element, a number of leading zeros, and
    approximating, for each element, an exponent value as a difference between a number of element bits −1 and the number of leading zeros of the element.

7. The processing device according to claim 6, wherein the processor is configured to further extract the exponents of the product by representing each element as $1.M*2^e$, where M is a mantissa and e is the exponent value.

8. The processing device according to claim 1, wherein the first plurality of elements and the second plurality of elements are in a float data type format.

9. The processing device according to claim 1, further comprising a display device,
    wherein information generated from the matrix multiplication is displayed on the display device.

10. The processing device of claim 1, wherein the computing system is a machine learning network and the third matrix is utilized to train the machine learning network.

11. The processing device of claim 10, wherein the target number is determined based on an effect the approximating will have on an accuracy of the machine learning network.

12. A method that improves computational efficiency of a computing system, the method comprising:
    receiving a portion of data of a first matrix and a portion of data of a second matrix, wherein the first matrix comprises a first plurality of elements and the second matrix comprises a second plurality of elements;
    calculating values for a third matrix, wherein the values of the third matrix are determined by:
        dropping a target number of products, determined at run time, from products of pairs of unsorted elements of the first matrix and unsorted elements of the second matrix based on approximating the products of the pairs of elements as a sum of values of bits of corresponding significance of exponents of the pairs of elements; and
        performing matrix multiplication on remaining products of the pairs of elements of the first matrix and the second matrix.

13. The method according to claim 12, wherein the products having the smallest sum of the exponents are dropped.

14. The method according to claim 12, further comprising determining which products are to be used to perform the matrix multiplication by:
    summing values of bits of corresponding significance of the exponents of the product, starting with the most significant bits for the exponents of the product, and
    comparing each result of the summing to the target number until the target number of product exponent values is determined.

15. The method according to claim 12, wherein the first plurality of elements and the second plurality of elements are in an integer data type format.

16. The method according to claim 15, further comprising extracting the exponents of the product by:
    determining absolute values of the first plurality of elements and the second plurality of elements;
    determining, for each element, a number of leading zeros, and
    approximating, for each element, an exponent value as a difference between a number of element bits −1 and the number of leading zeros of the element.

17. The method according to claim 16, further comprising extracting the exponents by representing each element as $1.M*2^e$, where M is a mantissa and e is the exponent value.

18. The method according to claim 12, wherein:
    the computing system is a machine learning network and the third matrix is utilized to train the machine learning network, and
    the target number is determined based on an effect the approximating will have on an accuracy of the machine learning network.

19. A non-transitory computer readable medium comprising instructions for improving computational of a computing system, the instructions when executed by a processor cause the processor to execute a method comprising:
  receiving a portion of data of a first matrix and a portion of data of a second matrix, wherein the first matrix comprises a first plurality of elements and the second matrix comprises a second plurality of elements;
  calculating values for a third matrix, wherein the values of the third matrix are determined by:
    dropping a target number of products, determined at runtime, from products of pairs of unsorted elements of the first matrix and unsorted elements of the second matrix based on approximating the products of the pairs of elements as a sum of values of bits of corresponding significance of exponents of the pairs of elements; and
    performing matrix multiplication on remaining products of the pairs of elements of the first matrix and the second matrix.

20. The non-transitory computer readable medium of claim 19, wherein the products having the smallest sum of the exponents are dropped.

21. The non-transitory computer readable medium of claim 19, wherein the computing system is a machine learning network and the third matrix is utilized to train the machine learning network.

* * * * *